United States Patent [19]
Nicolai

[11] Patent Number: 5,751,940
[45] Date of Patent: May 12, 1998

[54] MICROPROCESSOR INTEGRATED CIRCUIT WORKING IN INTERNAL ROM AND EXTERNAL RAM MODE

[75] Inventor: Jean Nicolai, Aix en Provence, France

[73] Assignee: SGS Thomson Microelectronics, S.A., Gentilly, France

[21] Appl. No.: 638,173

[22] Filed: Jan. 3, 1991

[30] Foreign Application Priority Data

Jan. 9, 1990 [FR] France .................. 9000169

[51] Int. Cl.[6] .................. G06F 11/00
[52] U.S. Cl. .................. 395/183.03
[58] Field of Search .................. 395/800, 500, 395/183.03; 371/325, 16.1, 16.2, 21.1, 22.1; 365/201

[56] References Cited

U.S. PATENT DOCUMENTS

| | | | |
|---|---|---|---|
| 4,514,805 | 4/1985 | McDonough et al. | 395/725 |
| 4,609,985 | 9/1986 | Dozier | 395/425 |
| 4,839,795 | 6/1989 | Iwaksaki | 395/275 |
| 4,982,427 | 1/1991 | Nicolai | 379/406 |
| 5,021,996 | 6/1991 | Watanabe | 395/800 |
| 5,027,118 | 6/1991 | Nicolai | 341/132 |
| 5,036,300 | 7/1991 | Nicolai | 331/143 |
| 5,053,949 | 10/1991 | Allison et al. | 364/200 |
| 5,062,034 | 10/1991 | Bakker | 395/500 |
| 5,070,311 | 12/1991 | Nicolai | 331/111 |
| 5,101,498 | 3/1992 | Ehlig et al. | 395/800 |

FOREIGN PATENT DOCUMENTS

| | | |
|---|---|---|
| 0 127 440 | 5/1984 | European Pat. Off. . |
| 57-143657 | 12/1982 | Japan . |
| 61-235953 | 3/1987 | Japan . |

OTHER PUBLICATIONS

DS5000 User's Guide: p. i, 2–3, 7–12, 50–52, 75–78.
Pp. 109–113 of 1989 Dallas Semiconductor data book (DS5000 Data Sheet).

*Primary Examiner*—William M. Treat
*Attorney, Agent, or Firm*—Robert Groover; Betty Formby; Matthew Anderson

[57] ABSTRACT

Integrated circuits can have both a microprocessor and an internal read-only memory of programs on one and the same chip. To facilitate the perfecting and finalizing of the programs of the read-only memory without undertaking the manufacture, for the perfecting and finalizing operation, of a special version of the circuit that is far too different from the definitive version, an external memory is used for the perfecting and finalizing operation. A contact pad of the chip is used for the transmission, in series mode, of a program coming from an external memory. A mode selection pad makes it possible to define whether the microprocessor must work in internal ROM mode (the normal mode) or in external ROM mode (the mode for the perfecting and finalizing operation). The circuit elements added to enable this dual operation take up little space, so that the definitive version of a circuit can be identical to the provisional perfecting and finalizing version, except that the definitive version contains a definitive program in the read-only memory. The content of the read-only memory can be defined by a single mask and, consequently, only a single different mask will have to be made for the definitive version.

26 Claims, 3 Drawing Sheets

VERSION A1

VERSION B1

VERSION A

VERSION B

VERSION A

VERSION B

स्र,751,940

MICROPROCESSOR INTEGRATED CIRCUIT WORKING IN INTERNAL ROM AND EXTERNAL RAM MODE

BACKGROUND OF THE INVENTION

1. Field of the Invention

The invention relates to microprocessor integrated circuits. It relates especially to circuits having both a microprocessor and a read-only memory (ROM) of programs on one and the same semiconductor chip. The ROM contains notably one or more programs to be carried out by the microprocessor.

The circuits especially concerned by the present invention are notably low-cost microcontrollers specially adapted to the needs of a customer and to a determined application.

2. Description of the Prior Art

The main problem encountered in the making of a circuit such as this arises during the stage for the perfecting and finalizing of the circuit and of the operation programs stored in the ROMs.

Indeed, the ROM is made by photolithographic masking, i.e. the pieces of data recorded in the invention are defined by a particular photolithographic mask configuration. For example, each memory cell is constituted by a transistor and the piece of binary data memorized in this cell is defined by the fact that the transistor has been masked or not masked during an operation of implantation for enhancement or depletion. Or again, the memory is constituted by transistors laid out in a matrix of lines and columns, and the piece of binary data memorized by a cell is defined by the fact that there is or there is not any conductive contact connecting the transistor to a line or column passing beside it (because of the masking or lack of masking during the operation for opening contact regions in an insulator layer).

The difficulty as regards the perfecting and finalizing stage is that an application program of the microprocessor has to be written, and that the microprocessor has to be made with this program stored in ROM. Then, the integrated circuit has to be tested. If the application is a rather complex one, there will probably be errors in the program. To correct the errors, it is necessary to make an integrated circuit again, and this includes the microprocessor and a new corrected program. This implies using a new set of masks. This very costly and very lengthy operation cannot be recommended several times. Therefore, in practice, the application program of the microprocessor must work perfectly well the very first time. Experience shows that this is rarely the case. Furthermore, this method enables the microprocessor to be tested only during the performance of the programs stored in the ROM. It does not provide for testing the microprocessor or the other elements of the circuit independently of these programs. For, in low-cost microcontrollers (in radio, car radio, HiFi, television and other applications), the simple fact of turning on the circuit starts up the programs stored in the ROM. The microprocessor can do nothing but execute these programs.

This is why a commonly adopted method is the following one, explained with reference to FIGS. 1 and 2: two different versions, a version A1 and a version B1, of an integrated circuit are made. These two versions are close to each other.

The first version (version A1) of the integrated circuit, which is intended for the perfecting and finalizing operation, has a microprocessor MP and the circuit elements that may be necessary in the application considered (notably input/output peripherals PH1, PH2 etc.), but it does not include any ROM of programs or, at any rate, this memory cannot be used.

To carry out programs, the microprocessor MP is connected to input/output terminals of the integrated circuit, specially designed for the perfecting and finalizing stage. These input/output terminals are designed for the transmission of data and addresses between the microprocessor and an electrically programmable memory MX, external to the integrated circuit. The external memory (EPROM or EEPROM) contains the programs to be carried out. It is electrically programmable and, consequently, the programs may be modified at will throughout the time taken for the perfecting and finalizing operation.

A final version of programs, corresponding to the application desired by the customer, is arrived at.

Then a definitive version B1 of the integrated circuit (FIG. 2) is designed and manufactured. This version contains a masked ROM of programs with the program data corresponding to unmodifiable definitive programs. This version B1 does not include the input/output terminals which were designed only for the transmission of programs coming from the external memory.

This mode of perfecting and finalizing an integrated circuit and applying it has the following drawbacks:

- since the versions A1 and B1 of the circuit are different, they require two (very costly) sets of masks, two mask-checking operations, two (very costly) manufacturing batches whereas, in any case, the version A1 is needed to produce only a small number of circuits for the purposes of designing and finalizing the circuit. The version A1 will not be a version manufactured for the customer on an industrial scale in batches;
- secondly, although the circuit A1 is intended only for the perfecting and finalizing operation, it has to be made on an industrial scale and in batches in order to detect the errors, bugs etc. which may appear in batch production. This means that a considerable amount of time is taken for developing and manufacturing of a new circuit for a customer.

SUMMARY OF THE INVENTION

The present invention is aimed at proposing a more efficient, less lengthy and less costly system to develop a microprocessor integrated circuit incorporating the microprocessor and a ROM of programs on the same chip.

To this end, there is proposed practically only one version of an integrated circuit, which is both the version designed for the perfecting and finalizing stage and the definitive industrially produced version, except for the fact that the definitive version may differ from the version intended for the test by the content of the ROM. This is achieved, notably, by designing the integrated circuit so that it has two modes of operation, one wherein the microprocessor carries out the programs stored in the internal ROM and the other wherein the microprocessor carries out modifiable programs contained in an external memory, with means to enable the transmission of addresses and data between the microprocessor and the external memory in the second mode. To avoid the need for making two different circuit versions, and so that the practically only one version is not excessively costly, it is provided that the means necessary for the operation with an external memory of programs will take up very little space and may remain on the definitive chip. In particular, one way of achieving this result is to use a contact pad of the chip for the transmission of addresses and data through this pad between the microprocessor and an electrically programmable external memory and a contact pad of the chip reserved for the reception, by the chip, of a signal for selecting the mode of operation of the circuit. In this way, during the perfecting and finalizing stage, there is applied a selection signal corresponding to the mode in which the microprocessor carries out the external memory programs transmitted in series through the specific contact pad. Then, for the circuit definitively manufactured in series and including the program fixed in an internal memory, the mode selection signal applied is the one corresponding to the definitive standard mode, namely the mode for the execution of the programs of the internal ROM.

The integrated circuit chip according to the invention includes, on the whole, the following additional elements as compared with a chip that would not at all require any perfecting and finalizing stage: a contact pad for the series transmission of addresses and program data between the external memory and the microprocessor, and a mode selection contact pad; and a multiplexer to route the addresses and data either towards the external memory or towards the internal memory as a function of the selection signal received at the selection pad. Possibly, it may be necessary to also have a contact pad for the transmission of synchronization signals, notably to define whether it is addresses or pieces of data that are exchanged at a given instant through the series transmission pad. Finally, the chip may include additional circuit elements such as parallel/series and series/parallel converters for cases where the microprocessor can work only with binary signals in parallel. The space occupied on the chip by all these additional circuits and additional contact pads is sufficiently restricted for it to be possible for them to remain on the definitive version of the fabricated circuit, although they are, in principle, unnecessary for the definitive circuit. This is what makes it possible to have practically only one version of the circuit, with only the mask that corresponds to the definition of the ROM data being specific to the final version.

It must be pointed out, besides, that the additional contact pads are not necessarily connected to external pins of the package of the definitive circuit. For the first version, designed for the perfecting and finalizing stage, the specific contact pads of this perfecting and finalizing stage should be connected to external pins of the package so that the necessary signals can be transmitted. But, for the definitive version, it is not absolutely necessary to connect all these specific pads to pins: for example, the pad for the transmission of addresses and data in series may remain unconnected since it no longer has anything to transmit. The same is true for the synchronization pad. As for the mode selection pad, it is quite possible to provide for it to be connected by a resistor or a (pull-up or pull-down) transistor to a supply terminal of the circuit so as to fix the binary state to which it is taken in the definitive version without its being necessary to apply this state from any special external pin.

One possibility of an implementation of the invention would consist in the use, for the circuits of the first version, of an integrated circuit package having some pins that are additional to those necessary in the definitive version. For the definitive circuit, a package with a smaller number of pins would be used, the specific contact pads of the perfecting and finalizing stage remaining unconnected.

Therefore, in short, according to a first major aspect of the invention, the integrated circuit has a specific contact pad which can be used during a stage of development of the integrated circuit and means to enable, during this stage, the transmission of addresses and data through this pad and to make the microprocessor execute a program transmitted through this pad and coming from an electrically programmable memory external to the circuit.

By this means, the microprocessor can be tested through programs external to the testing circuit (test programs or final application programs envisaged for the circuit). The development is done through an industrial prototype series. At the end of the development, the perfected and finalized final program is defined and the mask configuration that will be used for the storage in ROM is set up on a definitive basis. If the program has not been modified during the perfecting and finalizing operation, the circuits may be manufactured in batches.

If the program has had to be modified, the masks other than the ROM data configuration mask are unchanged. The making of the definitive mask therefore requires only one specific mask different from the masks already prepared for the prototype series which had been used for development.

A contact pad for selecting the operating mode of the integrated circuit is provided for on the chip. This pad may receive an electrical signal for mode selection (which is a binary signal in principle). For a value of the signal, the mode is the normal mode of operation of the circuit, in which the microprocessor carries out programs stored in the ROM of the circuit. For another value of the mode selection signal, the mode is the perfecting and finalizing mode in which the microprocessor carries out programs contained in the external memory, these programs being transmitted in series through the specific pin of the package.

And, furthermore, according to another aspect of the invention, to achieve the perfecting and finalizing of the integrated circuit, it is provided that the integrated circuit will include, firstly, means to make the microprocessor carry out either an internal program contained in the ROM of the circuit or an external program contained in external memory and transmitted through at least one specific contact pad of the integrated circuit chip, the choice between the external program and the internal program being commanded by a selection signal applied to a mode selection contact pad provided for on the chip, at least one of said contact pads being not connected to an external pin of the package of the integrated circuit in its definitive version.

BRIEF DESCRIPTION OF THE DRAWINGS

Other characteristics and advantages of the invention will appear from the following detailed description, made with reference to the appended drawings, of which.

DETAILED DESCRIPTION OF THE INVENTION

Figure 1:
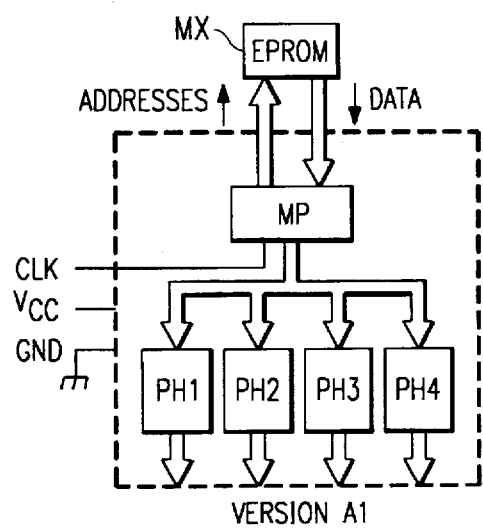
FIGS. 1 and 2 show the versions A1 (circuit for the perfecting and finalizing operation) and B1 (definitive circuit) of an integrated circuit chip containing a microprocessor and a ROM of internal programs.
Figure 2:
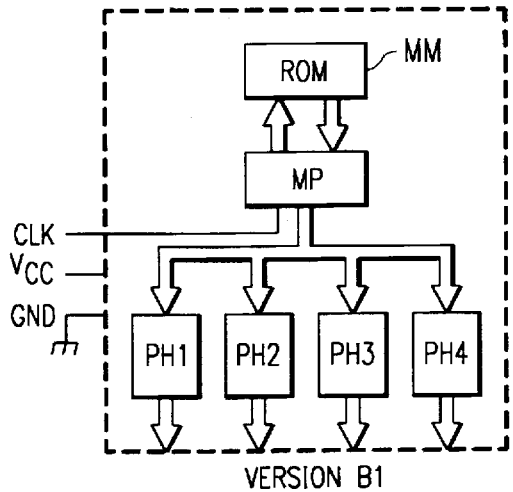
Figure 3:
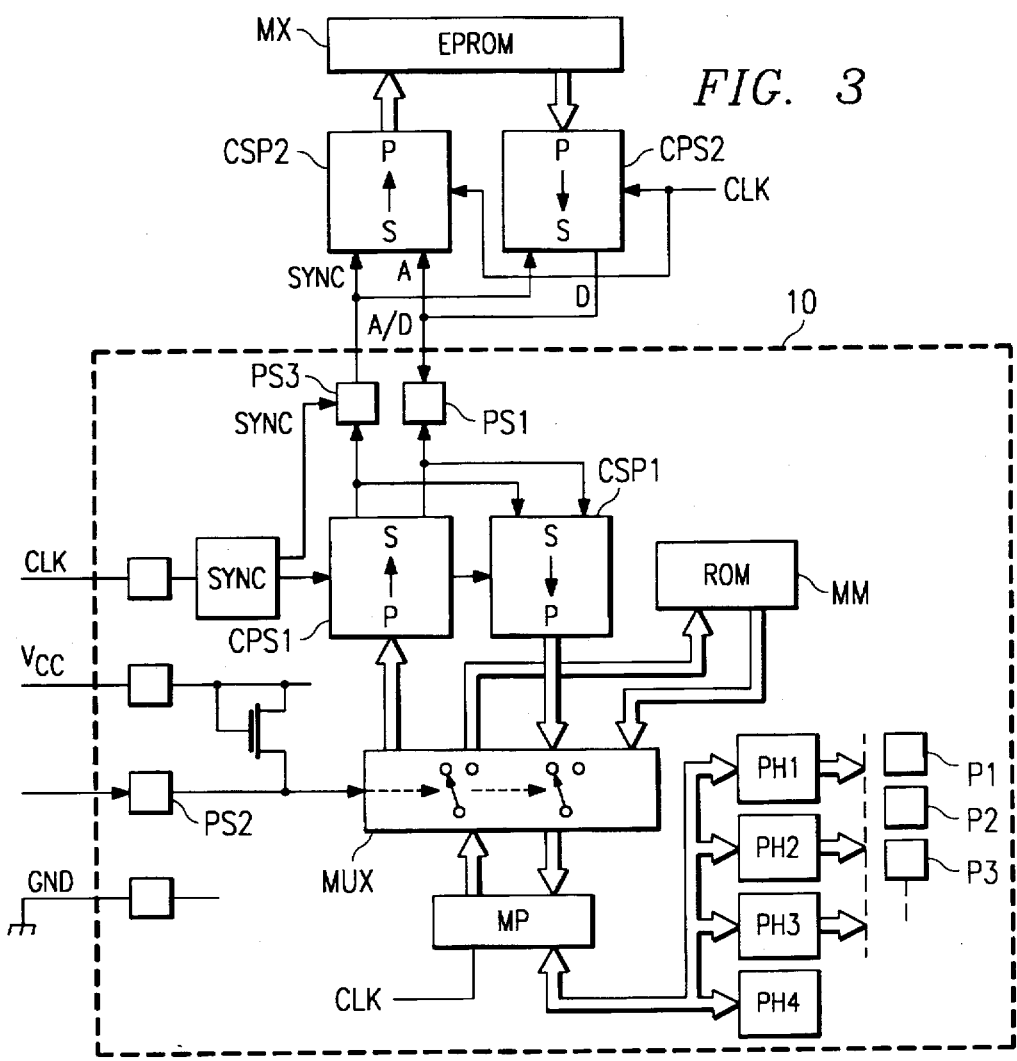
FIG. 3 shows the practically only one version of the integrated circuit made according to the invention, enabling the perfecting and finalizing operation and then the definitive use of the circuit.

In FIG. 3, the integrated circuit chip is designated by the reference 10. It has a certain number of circuit elements and, notably, a microprocessor MP and various peripheral circuits PH1, PH2, . . . , as well as a ROM of programs MM. The chip also has a number of access contact pads P1, P2, P3, etc. designed to be connected to external pins when the chip is enclosed in a package. These pads are used for the transmission of signals between the chip and the exterior.

The circuit elements and contact pads necessary for the working of the chip in the function that it has to fulfil for its ultimate user may be any elements and pads, and do not need to be described. The microprocessor works under the control of the programs contained in the internal read-only memory MM, and the peripherals enable the reception and transmission of the signals as a function of these programs, through the contact pads and the package pins that are connected to these pads.

The additional elements which are part of the chip and are designed specifically to facilitate the perfecting and finalizing of the application programs of the ROM are the following in the example of FIG. 3:

- a contact pad PS1, called a "series transmission pad" designed for the series transmission of addresses and data between the microprocessor and an external memory MX, which is electrically programmable (EPROM or EEPROM).
- a contact pad PS2, called a "mode selection pad", designed to receive a mode selection signal enabling the circuit to be made to go from a first mode (the normal mode) in which the microprocessor carries out the programs of the internal memory MM, to a second mode (the perfecting and finalizing mode) in which the microprocessor carries out the programs contained in the external memory and transmitted through the pad PS1;
- possibly a third pad PS3, called a "synchronization" pad used to define, at a given instant, whether the transmitted signals are addresses sent to the memory or pieces of data received from the external memory MX;
- a multiplexer MUX commanded by the mode selection pad PS2, to route the addresses and data either between the microprocessor and the internal memory or between the microprocessor and the external memory, depending on the binary state present at the pad PS2;
- if necessary, series/parallel converters CSP1 and parallel/series converters CPS1, should the microprocessor work on addresses and pieces of data constituted by binary words in parallel. In this way, the pieces of parallel data coming from the microprocessor and intended for the external memory are converted into pieces of series data before going towards the pad PS1, and reciprocally, the series data coming from the external memory through the pad PSI are converted into parallel data. The external memory itself may need parallel/series and series/parallel converters to communicate in series with the pad PS1. These additional converters CPS2 and CSP2 do not form part of the integrated circuit.

The diagram of FIG. 3 corresponds to both versions of the integrated circuit that are made: the perfecting and finalizing version made in very small batches and the definitive version which is very close to the finalizing version and is made in large batches. The following are the differences between the two versions:

- the definitive version has definitive ROM program data, while the perfecting and finalizing version has different pieces of data: either programs that are not quite finalized (for example a first version of these programs) or programs or data enabling tests, or again no program and no piece of data; a single photolithographic mask is used to define these pieces of data. Consequently, the definitive version differs from the provisional version by only one mask;

in certain embodiments of the invention, the definitive version may have one or more of its specific contact pads PS1 and/or PS2, and/or PS3, not connected to external pins of the package of the circuit. The provisional version for the perfecting and finalizing stage makes it necessary, on the contrary, to have a connection of these specific contact pads PS1, PS2, PS3 to pins of the package.

For the contact pad PS1 (series transmission contact), it is understood that, after the perfecting and finalizing stage, it is no longer necessary to connect it since there is no longer any need for communication with the external memory.

Nor is the pad PS3 any longer necessary since it is used for the synchronization of the series transmissions through the contact PS1.

As for the mode selection pad PS2, it is enough for a well-determined logic level (for example the high level) to be applied to this pad in the definitive version, this level corresponding to the normal working mode. And it is necessary, however, for it to be possible to apply a contrary level to this pad when this pad is connected to an external pin in the version designed for the perfecting and finalizing operation. To this end it is possible, for example, to connect the pad PS2 to a supply pad Vcc of the integrated circuit through a resistive element or a "pull-up" transistor. In this way, when a low level is applied to the pad PS2 by means of an external signal, this low level commands the multiplexer MUX in one direction. However, when no signal is applied to the pad PS2, the transistor or the resistor pulls this pad towards the high level and controls the multiplexer in the other direction.

Figure 4:
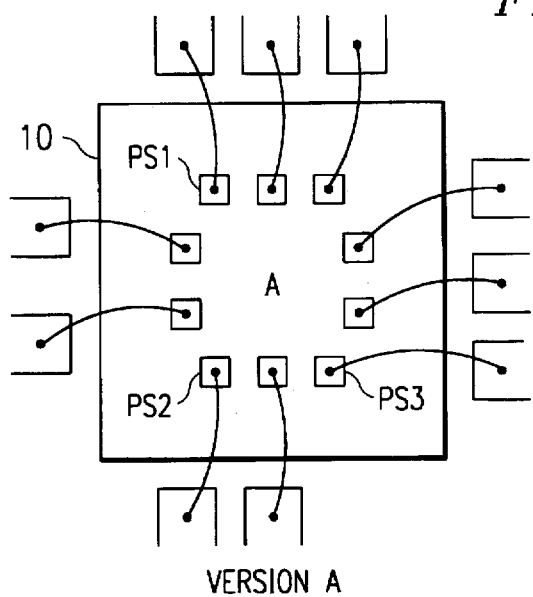
FIGS. 4 to 7 represent various modes of connection of the contact pads of the chip to external package pins, in the provisional version and in the definitive version of the circuit.
Figure 4:
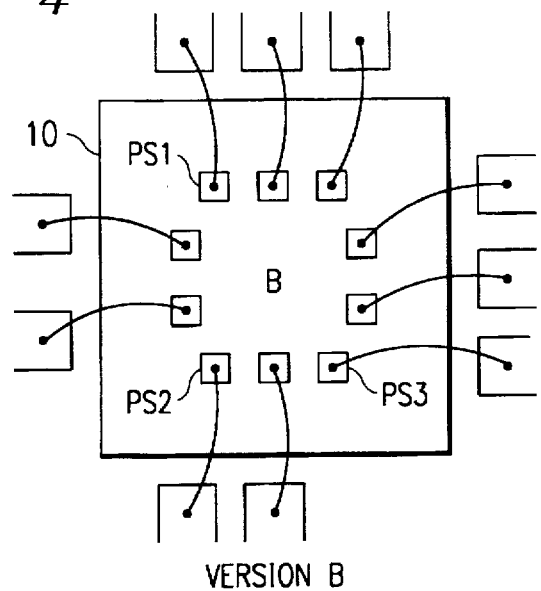

There are therefore several possibilities of implementing the invention with respect to encapsulation in a package. In a first possibility (FIG. 4), the specific pads PS1, PS2, PS3 are connected to pins of the package in the provisional version (A) as well as in the definitive version (B). The package therefore includes as many pins as are necessary for the functions that it must fulfil for the ultimate user, plus the three pins corresponding to the pads PS1, PS2, PS3. This has the advantage of using the same package for the provisional version and for the definitive version.

Figure 5:
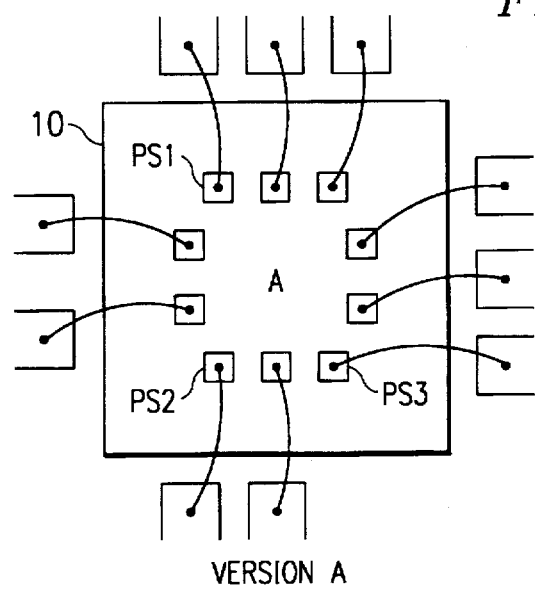
Figure 5:
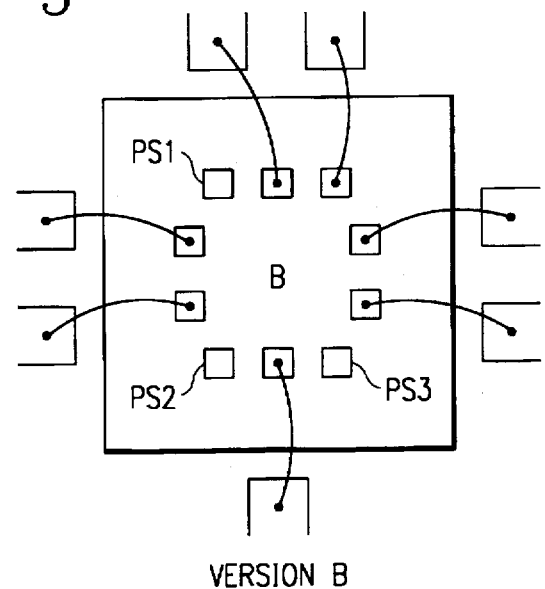

In another possibility (FIG. 5), the specific pads are not connected in the definitive version (B). However, in the provisional version (A), a package having three pins more than the package of the definitive version is used.

Figure 6:
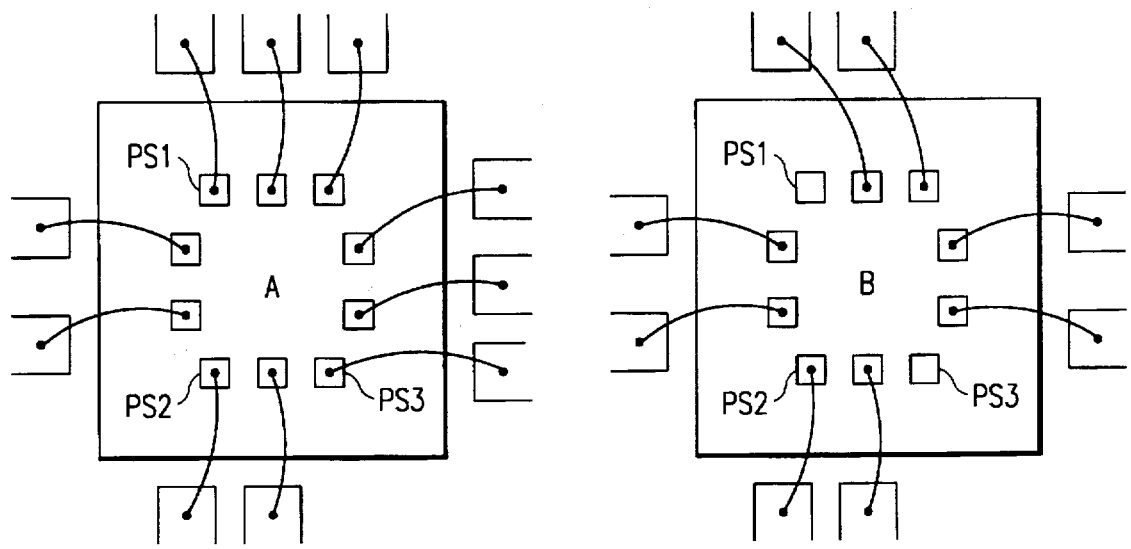

In yet another possibility (FIG. 6), one or two of the specific pads are connected in the definitive version (B) as in the provisional version (A), the other specific pad or pads remaining disconnected for the definitive version.

Figure 7:
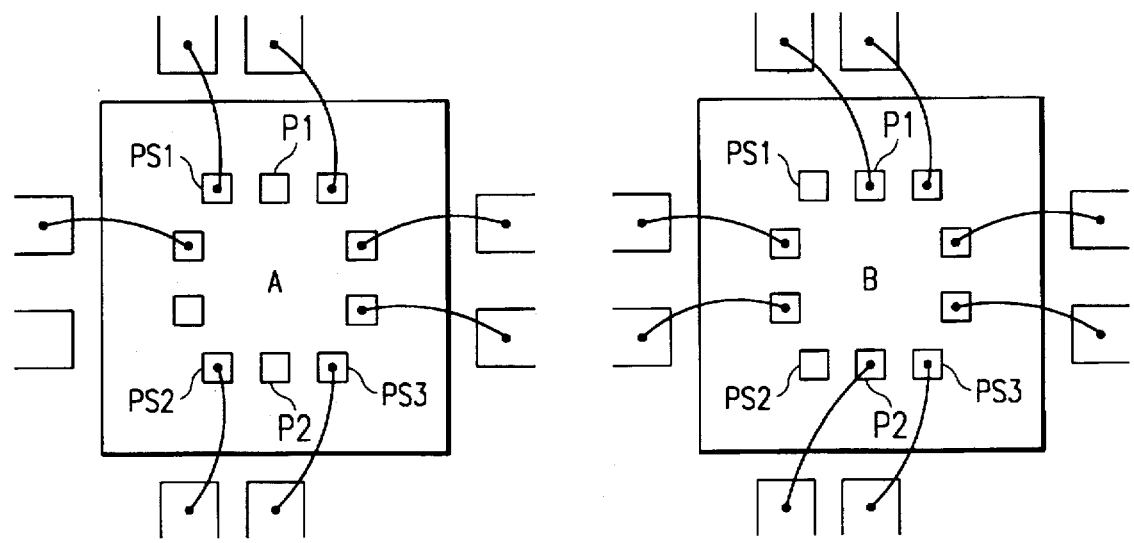

Finally it is possible, exceptionally (FIG. 7) to envisage an example where one or more specific contact pads PS1, PS2, PS3, are connected, in the provisional version, to contact pins that are reserved, in the definitive version, for other uses, hence for connection with other pads Pi, P2, P3 (outputs of certain peripherals etc.). However, it should be clearly understood that, in this case, the perfecting and finalizing stage does not provide for the complete testing of the application since certain pins of the circuit will not be in the configuration that they should have in the definitive version. Therefore, in principle, this can be envisaged only for pins P1, P2, P3 which are not of critical importance in the invention.

Besides it is also possible to envisage a case, which however has the same drawbacks as the foregoing one, where the specific contact pads are merged with contact pads normally used in the definitive version, with multiplexing circuits enabling these pads to be assigned either a specific function of the perfecting and finalizing stage or the normal function that they will have in the definitive version.

The definitive version is perfected and finalized as follows:

The first version of the circuit is manufactured in a prototype series. It is tested by means of programs installed in the external memory MX and transmitted in series mode through the pad PS1 by means of synchronization signals transmitted by the pad PS3 (these signals are also used for the control of the converters CSP1, CSP2, CPS1, CPS2). These programs may be modified as and when the need arises during the perfecting and finalizing stage, until satisfactory programs are obtained. During this finalizing stage, the pad PS2 is taken to a logic level such that the multiplexer MUX connects the microprocessor to the external memory MX and not the the internal memory MM.

A set of masks is then prepared for the definitive version (a single mask different from those of the provisional version). The encapsulation is done in one of the ways indicated above. The pad PS2 is connected to a logic level such that the multiplexer connects the microprocessor to the internal memory either by a resistor or by a "pull-up" transistor present from the very outset in both versions, or again by the application of an external signal if the pad PS2 is connected to an external pin in the definitive version.

What is claimed is:

1. An integrated circuit component comprising an integrated circuit chip encapsulated in a package having external pins, said integrated circuit comprising a microprocessor, a program read-only memory to contain a program to be carried out by the microprocessor and pads, capable of being connected to said external pins of said package, including at least one serial transmission contact pad, connected to said microprocessor for the serial transmission of addresses and data to and from said microprocessor, and at least one mode selection contact pad for selecting the mode of operation of the microprocessor, said integrated circuit further comprising a mode selection circuit to select between first and second possible modes of operation of said microprocessor as a function of a signal present at said mode selection contact pad, said first mode of operation being the execution of a program which is serially interfaced to said microprocessor through said serial transmission pad, said second mode of operation being the execution of a program contained in said program read-only memory;

and wherein at least one of said transmission contact pad and said mode selection contact pad is not connected to an external pin of the packages;

whereby said first mode of operation is inoperative in said package.

2. An integrated circuit chip in accordance with claim 1 wherein said mode selection contact pad is connected through a resistive circuit element to a voltage supply terminal of said integrated circuit.

3. An integrated circuit chip in accordance with claim 1 wherein said mode selection contact pad is connected through a transistor to a voltage supply terminal of said integrated circuit.

4. An integrated circuit chip in accordance with claim 1 wherein said mode selection circuit comprises a multiplexer controlled by the signal at said mode selection contact pad to select one of said two possible modes of operation of the microprocessor.

5. An integrated circuit chip in accordance with claim 1 further comprising a parallel/series converter and a series/parallel converter connected between said microprocessor and said transmission contact pad.

6. An integrated circuit chip in accordance with claim 1 further comprising a synchronizing contact pad to transmit a synchronizing signal defining the nature of the signals at said transmission contact pad so as to distinguish between addresses and data.

7. An integrated circuit chip in accordance with claim 1 wherein said mode selection circuit comprises a multiplexer controlled by the signal at said mode selection contact pad to select one of said two possible modes of operation of the microprocessor, and wherein said mode selection contact pad is connected through a transistor to a voltage supply terminal of said integrated circuit.

8. An integrated circuit chip in accordance with claim 1 wherein said mode selection circuit comprises a multiplexer controlled by the signal at said mode selection contact pad to select one of said two possible modes of operation of the microprocessor, and wherein said integrated circuit further comprises a parallel/series converter and a series/parallel converter connected between said microprocessor and said transmission contact pad.

9. An integrated circuit chip in accordance with claim 1 wherein said mode selection circuit comprises a multiplexer controlled by the signal at said mode selection contact pad to select one of said two possible modes of operation of the microprocessor, and wherein said chip further comprises a synchronizing contact pad to transmit a synchronizing signal defining the nature of the signals at said transmission contact pad so as to distinguish between addresses and data.

10. An integrated circuit chip in accordance with claim 9 further comprising a parallel/series converter and a series/parallel converter connected between said microprocessor and said transmission contact pad.

11. An integrated circuit chip in accordance with claim 10 wherein said mode selection contact pad is connected through a resistive circuit element to a voltage supply terminal of said integrated circuit.

12. An integrated circuit chip in accordance with claim 10 wherein said mode selection contact pad is connected through a transistor to a voltage supply terminal of said integrated circuit.

13. An integrated circuit package having encapsulated therein a chip in accordance with claim 1, said package having external pins for connections to said integrated circuit on said chip, and wherein at least one of said transmission contact pad and said mode selection contact pad is not connected to an external pin of the package.

14. An integrated circuit package having encapsulated therein a chip therein a chip in accordance with claim 4, said package having external pins for connections to said integrated circuit on said chip, and wherein at least one of said transmission contact pad and said mode selection contact pad is not connected to an external pin of the package.

15. An integrated circuit package having encapsulated therein a chip in accordance with claim 5, said package having external pins for connections to said integrated circuit on said chip, and wherein at least one of said transmission contact pad and said mode selection contact pad is not connected to an external pin of the package.

16. An integrated circuit package having encapsulated therein a chip in accordance with claim 6, said package having external pins for connections to said integrated circuit on said chip, and wherein at least one of said transmission contact pad and said mode selection contact pad is not connected to an external pin of the package.

17. An integrated circuit package having encapsulated therein a chip in accordance with claim 10, said package having external pins for connections to said integrated circuit on said chip, and wherein at least one of said transmission contact pad and said mode selection contact pad is not connected to an external pin of the package.

18. A method for the manufacture of an integrated circuit chip having an integrated circuit thereon with said integrated circuit comprising a microprocessor and a program read-only memory containing a program to be carried out by the microprocessor, the integrated circuit having at least one transmission contact pad enabling the transmission of addresses and data between the microprocessor and an electrically programmable memory which would be located external to the chip, at least one mode selection contact pad for selecting the mode of operation of the microprocessor, and a mode selection circuit to select one of two possible modes of operation of the microprocessor as a function of a signal present at said mode selection contact pad, the first mode of operation involving the connection of the microprocessor to an electrically programmable memory located external to the chip, the second mode of operation involving the connection of the microprocessor to said program read-only memory; wherein said method comprises:

during a stage for the perfecting and finalizing of the circuits of a first version of the chip and programs to be contained in the read-only memory, the step of applying a specific logic level to said mode selection contact pad to place the microprocessor in said first mode of operation, and the step of causing said microprocessor to carry out at least one program contained in said electrically programmable memory located external to the chip wherein the microprocessor exchanges addresses and data with said electrically programmable memory through said transmission contact pad; and during a stage of manufacturing the chip in a final version which differs from said first version only in the program content of the program read-only memory, the step of systematically applying to said mode selection contact pad a logic level complementary to said specific logic level, to thereby select the second mode of operation for said microprocessor.

19. A method in accordance with claim 18, further comprising the step, during said stage for the perfecting and finalizing, of encapsulating the first version of the chip in a package having a predetermined number of external pins; and the step, during the stage of manufacturing the chip in a final version, of encapsulating the final version of the chip in a package having fewer external pins than said predetermined number of external pins, at least one of said transmission contact pad and said mode selection contact pad being not connected to an external pin in the package of the final version of the chip.

20. A method in accordance with claim 18, wherein said step of systematically applying to said mode selection contact pad a logic level complementary to said specific logic level is accomplished by connecting said mode selection contact pad through a resistive circuit element to a voltage supply terminal of the integrated circuit.

21. A method in accordance with claim 18, wherein said step of systematically applying to said mode selection contact pad a logic level complementary to said specific logic level is accomplished by connecting said mode selection contact pad through a transistor to a voltage supply terminal of the integrated circuit.

22. A method in accordance with claim 18, wherein the step of causing said microprocessor to carry out at least one program contained in said electrically programmable memory located external to the chip wherein the microprocessor exchanges addresses and data with said electrically programmable memory through said transmission contact pad comprises causing said microprocessor to carry out at least one program contained in said electrically programmable memory located external to the chip wherein the microprocessor exchanges addresses and data with said electrically programmable memory through first and second parallel/series converters and first and second series/parallel converters, said first parallel/series converter and said first series/parallel converter being connected between said microprocessor and said transmission contact pad, and said second parallel/series converter and said second series/parallel converter being located external to the chip and connected between said transmission contact pad and said electrically programmable memory.

23. A method in accordance with claim 18 wherein the chip further comprises a synchronizing contact pad, and wherein the method further comprises, during the stage for the perfecting and finalizing of the circuits of a first version of the chip and programs to be contained in the read-only memory, the step of transmitting a synchronizing signal to the synchronizing contact pad to define the nature of the signals at the transmission contact pad so as to distinguish between addresses and data.

24. A packaged integrated circuit comprising:

a program read-only memory, and a microprocessor core connected to execute programs from said read-only memory;

serial/parallel and parallel/serial interface logic, connected to provide communication of addresses and between at least one serial transmission contact pad and said microprocessor cores;

a mode selection circuit connected and configured to select between first and second possible modes of operation of said microprocessor as a function of a signal present at a mode selection contact pad,
said first mode of operation being the execution of a program which is interfaced to said microprocessor through said serial transmission contact pad, and
said second mode of operation being the execution of a program contained in said program read-only memory;

and wherein at least one of said transmission contact pad and said mode selection contact pad is not connected to any externally accessible connector of said package;

whereby said first mode of operation is inoperable in said packaged integrated circuit.

25. A packaged integrated circuit comprising:

a program read-only memory, and a microprocessor core connected to execute programs from said read-only memory;

serial/parallel and parallel/serial interface logic, connected to provide serial communication of addresses and data between at least one serial transmission contact pad and said microprocessor core, in accordance with signals provided at a synchronizing contact pad to distinguish between addresses and data;

a mode selection circuit connected and configured to select between first and second possible modes of operation of said microprocessor as a function of a signal present at a mode selection contact pad which is operatively connected to a voltage supply terminal, said first mode of operation being the execution of a program which is interfaced to said microprocessor through said serial transmission contact pad, and said second mode of operation being the execution of a program contained in said program read-only memory;

and wherein at least one of said transmission contact pad and said mode selection contact pad is not connected to any exterior portion of the package;

whereby said first mode of operation is inoperable in said packaged integrated circuit.

26. A method for developing integrated circuits which include programmable logic and read-only program memory, comprising the steps of:

(a) providing a first version of said integrated circuit, and connecting said programmable logic thereof, through a serial/parallel and parallel/serial interface, to fetch and execute program instructions from an off-chip memory;

(b) developing software for a given application, using the apparatus of step (a);

(c) manufacturing integrated circuits in a final version, which is identical to said first version except that said read-only program memory contains at least some software developed in said step (b), and packaging said integrated circuits in a configuration such that at least some connections necessary for said serial/parallel and parallel/serial interface are inaccessible.

* * * * *